(12) United States Patent
Fukuzawa (10) Patent No.: US 11,064,097 B2
(45) Date of Patent: Jul. 13, 2021

(54) IMAGING APPARATUS FOR ADJUSTING PRESSING FORCES OF AN ULTRASONIC MOTOR AND A WATERPROOF MEMBER

(71) Applicant: CANON KABUSHIKI KAISHA, Tokyo (JP)

(72) Inventor: Kazuhiro Fukuzawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/665,517

(22) Filed: Oct. 28, 2019

(65) Prior Publication Data
US 2020/0145584 A1    May 7, 2020

(30) Foreign Application Priority Data

Nov. 1, 2018  (JP) .............................. JP2018-206395
Sep. 5, 2019  (JP) .............................. JP2019-162217

(51) Int. Cl.
*H04N 5/225*   (2006.01)
*H04N 5/232*   (2006.01)
(Continued)

(52) U.S. Cl.
CPC ........... *H04N 5/2252* (2013.01); *G03B 17/08* (2013.01); *G08B 13/1963* (2013.01);
(Continued)

(58) Field of Classification Search
None
See application file for complete search history.

(56) References Cited

U.S. PATENT DOCUMENTS 6,268,882 B1 *  7/2001  Elberbaum ...... G08B 13/19619
                                                    348/143
10,522,735 B2 * 12/2019  Tokuda .................. H02N 2/163
(Continued)

FOREIGN PATENT DOCUMENTS

CN   207897050 U   9/2018
EP   1136965 A1    9/2001
(Continued)

OTHER PUBLICATIONS

Extended European Search Report issued by the European Patent Office dated Apr. 28, 2020 in corresponding European Patent Application No. 19205745.3.
(Continued)

*Primary Examiner* — Twyler L Haskins
*Assistant Examiner* — Wesley J Chiu
(74) *Attorney, Agent, or Firm* — Carter, DeLuca & Farrell LLP (57) ABSTRACT

A waterproof effect enhancing structure that can make an imaging apparatus compact. A camera unit including an imaging element, a rotation shaft that is a center of rotation of the camera unit, a bearing that rotatably supports the rotation shaft, a base member that supports the bearing, a presser member that is fixed to the rotation shaft, an ultrasonic motor that is disposed on a same axis as the rotation shaft, and has a rotor that is brought into pressure contact with the presser member, and a stator that is brought into pressure contact with the base member, and a waterproof unit disposed between the base member and the camera unit are placed in the imaging apparatus, and the camera unit, the waterproof unit, the base member, the ultrasonic motor, and the presser member are disposed in a rotation axis direction in this order.

10 Claims, 5 Drawing Sheets

(51) Int. Cl.
  *G03B 17/08* (2021.01)
  *G08B 13/196* (2006.01)
  *F16M 11/20* (2006.01)
  *F16M 11/10* (2006.01)

(52) U.S. Cl.
  CPC ... *H04N 5/225251* (2018.08); *H04N 5/23299* (2018.08); *F16M 11/10* (2013.01); *F16M 11/2014* (2013.01); *G03B 2205/0053* (2013.01)

(56) References Cited

U.S. PATENT DOCUMENTS

| | | | | |
|---|---|---|---|---|
| 2005/0206779 | A1* | 9/2005 | Aoki | F16M 13/027 |
| | | | | 348/373 |
| 2006/0033288 | A1* | 2/2006 | Hughes | F16J 15/4476 |
| | | | | 277/412 |
| 2011/0234041 | A1* | 9/2011 | Kanazawa | H02N 2/009 |
| | | | | 310/300 |
| 2014/0196293 | A1* | 7/2014 | Kodaira | H02K 7/108 |
| | | | | 33/227 |
| 2017/0203332 | A1* | 7/2017 | Tokuda | B06B 1/06 |
| 2017/0207384 | A1* | 7/2017 | Tokuda | G01S 7/481 |
| 2017/0309806 | A1* | 10/2017 | Kumagai | G01C 3/08 |
| 2017/0310248 | A1* | 10/2017 | Kumagai | H02N 2/142 |
| 2017/0363932 | A1 | 12/2017 | Lim et al. | |
| 2018/0063432 | A1* | 3/2018 | Wada | H04N 7/185 |
| 2018/0352124 | A1* | 12/2018 | Obana | H04N 5/23203 |
| 2018/0367738 | A1* | 12/2018 | Fukuzawa | H04N 5/23299 |
| 2019/0051126 | A1* | 2/2019 | Fukuzawa | G08B 13/1963 |
| 2019/0098189 | A1* | 3/2019 | Kimura | H04N 5/2256 |
| 2019/0331986 | A1* | 10/2019 | Sasaki | G03B 17/02 |

FOREIGN PATENT DOCUMENTS

| | | |
|---|---|---|
| EP | 1493959 A2 | 1/2005 |
| WO | 2016151993 A1 | 9/2016 |

OTHER PUBLICATIONS

Notification of the First Office Action dated Apr. 27, 2021 by the State Intellectual Property Office of P. R. China in corresponding CN Patent Application No. 201911054335.0, with English translation.

* cited by examiner

IMAGING APPARATUS FOR ADJUSTING PRESSING FORCES OF AN ULTRASONIC MOTOR AND A WATERPROOF MEMBER

BACKGROUND OF THE INVENTION

Field of the Invention

The present invention relates to an imaging apparatus.

Description of the Related Art

Conventional imaging apparatuses exemplified by monitoring cameras include an imaging apparatus in which a pan/tilt angle of a camera unit can be operated by a step motor in order to photograph a position and direction desired by a user. Here, in the case of the imaging apparatus that does not include a protection cover for a camera section, which is generally called a dome, there is a possibility that raindrops/dust enter an inside of a case from a gap between a fixed side member and a drive side member of the case in a pan/tilt operation. As a countermeasure against this, for example, U.S. Patent Application Publication No. 2017/0363932 discloses a configuration in which a packing is inserted between the fixed side member and the drive side member of a case in a pan/tilt operation, and a pan/tilt operation is performed while the packing is slid.

In an imaging apparatus, a step motor has been conventionally used to perform a pan/tilt operation. In the case of a step motor, a motor is fixed to a sealed space covered with a cover of a fixed side member, and a driving force is transmitted to a rotation shaft through a belt and a gear to rotate a camera unit. In the imaging apparatus, the packing that handles with entry of raindrops/dust into the case can be attached in such a way as to seal a gap between the camera unit and the fixed side member in a close vicinity of an outer periphery of the rotation shaft.

Here, for the purpose of photographing a target by zooming in on the target from a distance, it is necessary to adjust a photographing direction of the camera finely to keep the target within an angle of view. Consequently, it is conceivable to perform a pan/tilt operation by using an ultrasonic motor (Ultrasonic Motor: hereinafter, referred to as a USM) that is more excellent in stop position accuracy than a step motor in general as a driving source of the camera.

The USM needs to press the stator to the rotor in order to transmit vibration. Further, the packing has an elastic force. Therefore, depending on the positional relationship between the packing and the USM, the pressing force and the elastic force influence each other, and adjustment may be difficult.

SUMMARY OF THE INVENTION

One of objects of the present invention is to provide an imaging apparatus that can facilitate adjustment of pressing forces of an ultrasonic motor and a waterproof member.

In order to solve the above described problem, the imaging apparatus according to one aspect of the present invention has the following configuration. That is to say, a camera unit rotatable in a tilt direction, a rotation shaft that is a center of rotation of the camera unit, a base member that supports the rotation shaft, an ultrasonic motor that is disposed on a same axis as the rotation shaft, and drives the camera unit in the tilt direction, a presser member that brings the ultrasonic motor into pressure contact with the base member, and a waterproof member that is disposed between the base member and the camera unit, wherein in a rotation axis direction, the camera unit, the waterproof member, the base member, the ultrasonic motor, and the presser member are disposed in this order.

According to the present invention, a waterproof effect enhancing structure that can make the imaging apparatus compact, and the imaging apparatus having the waterproof effect enhancing structure can be provided.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Hereinafter, an exemplary embodiment for carrying out the present invention will be described in detail with reference to the accompanying drawings. However, dimensions, materials, relative positions of components and the like described in the following embodiment are arbitrary and can be changed in accordance with a configuration of an apparatus to which the present invention is applied or various conditions. Further, when the elements which are the same or functionally similar are shown, same reference signs are used among the drawings.

In the following embodiment, a monitoring camera is illustrated as an imaging apparatus including a waterproof structure according to the present invention, but an application example of the present invention is not limited to the monitoring camera as long as the imaging apparatus is required to have weatherability. Note that in the following embodiment, an electronic substrate, a wiring cable and the like that do not have direct relationship with the present invention may be handled as not illustrated. Further, for convenience of explanation, shapes and the like of components may be simplified and described.

Figure 1:
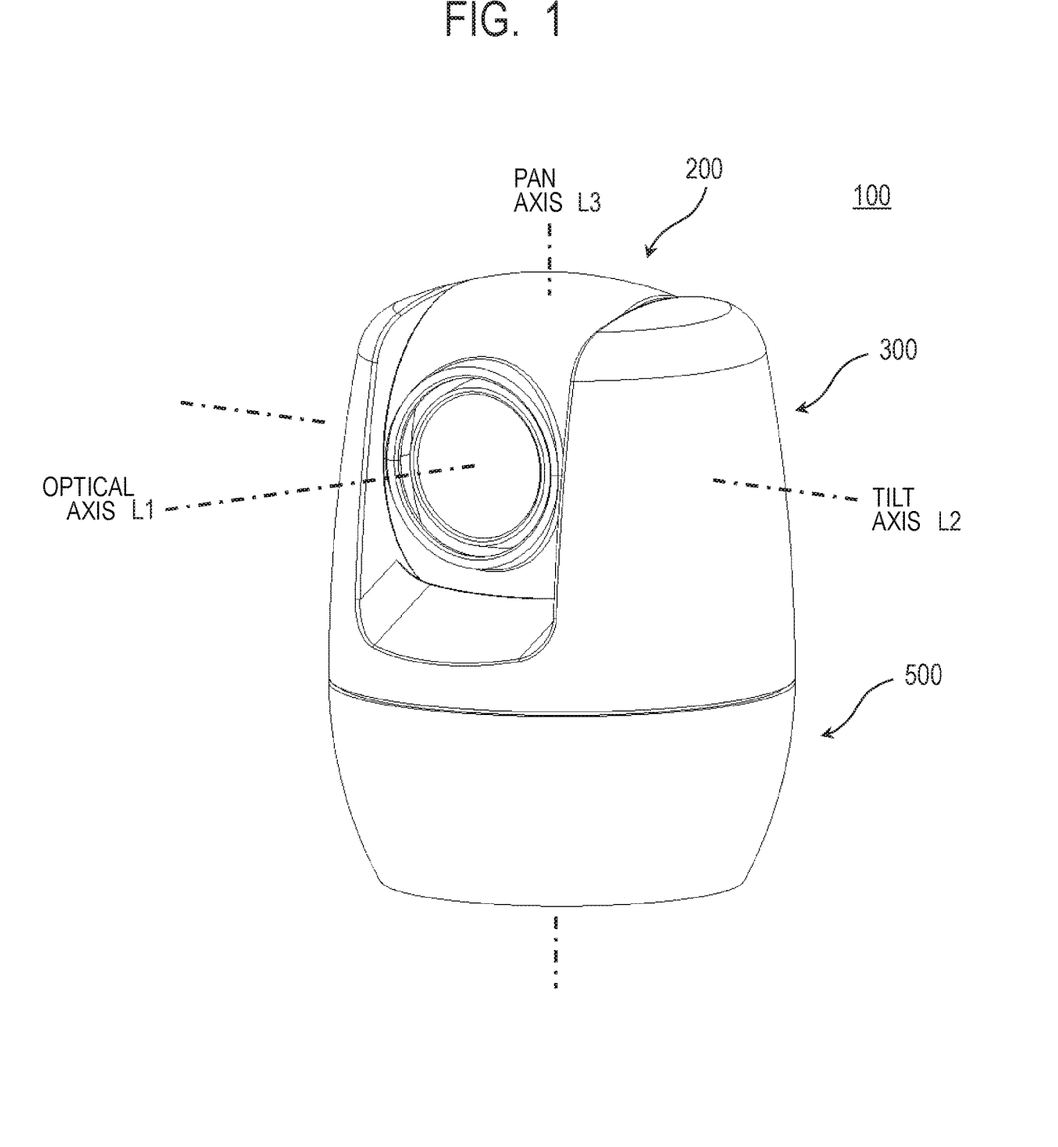
FIG. 1 is an external view of an imaging apparatus according to one embodiment of the present invention.
Figure 2:
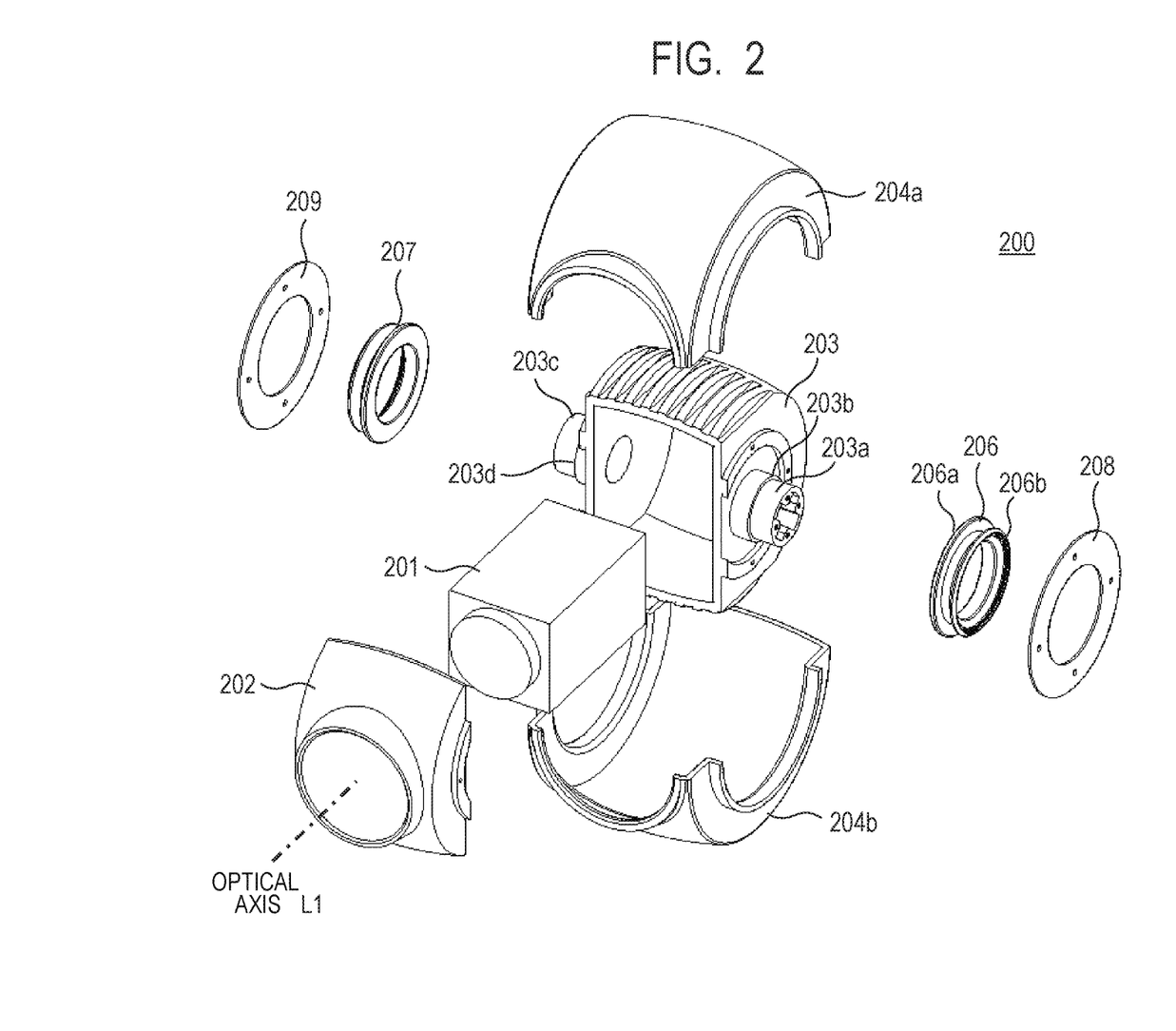
FIG. 2 is an exploded view illustrating a schematic configuration of a camera unit in the imaging apparatus illustrated in FIG. 1.
Figure 3:
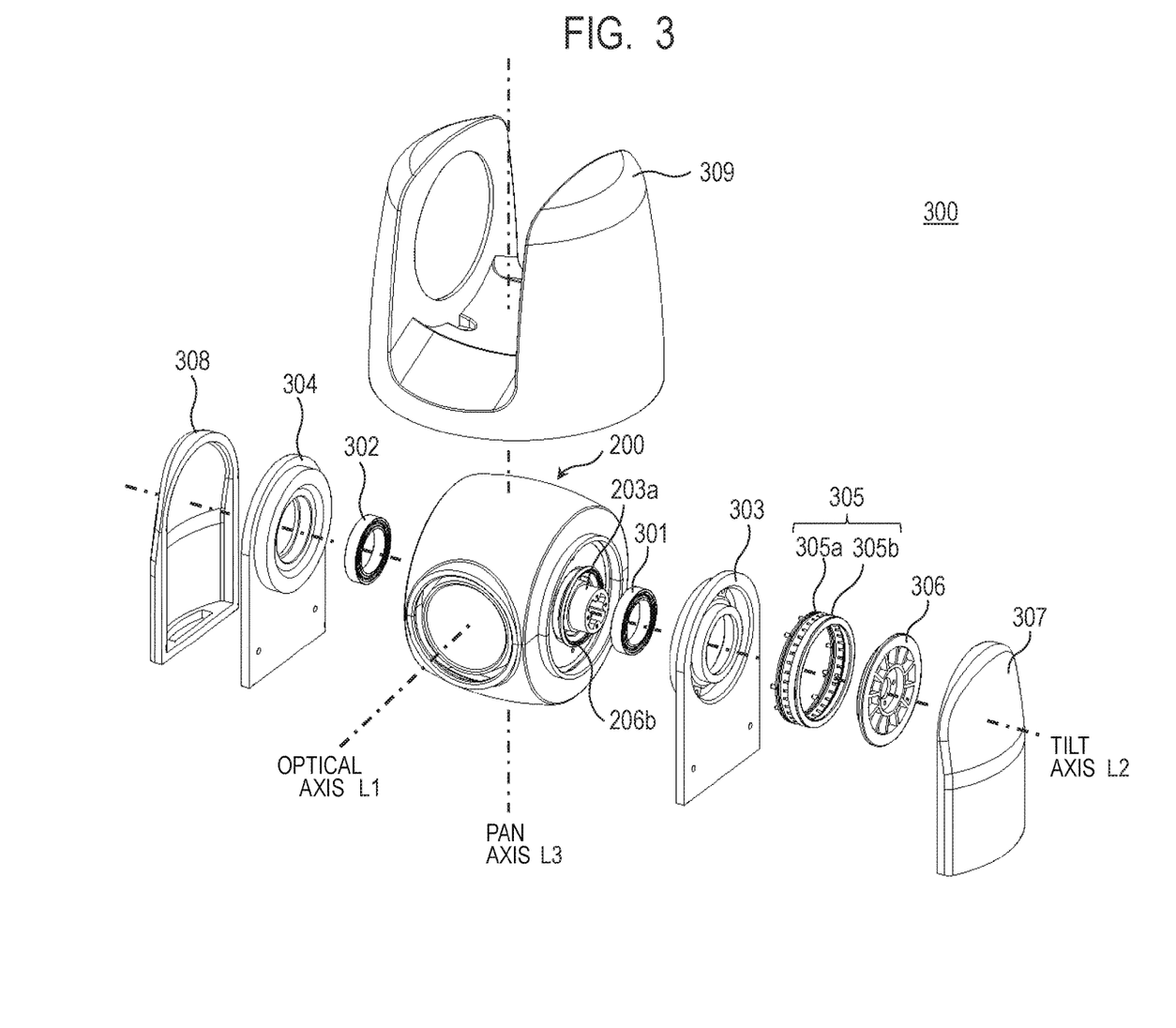
FIG. 3 is an exploded view illustrating a schematic configuration of a tilt unit in the imaging apparatus illustrated in FIG. 1.
Figure 4:
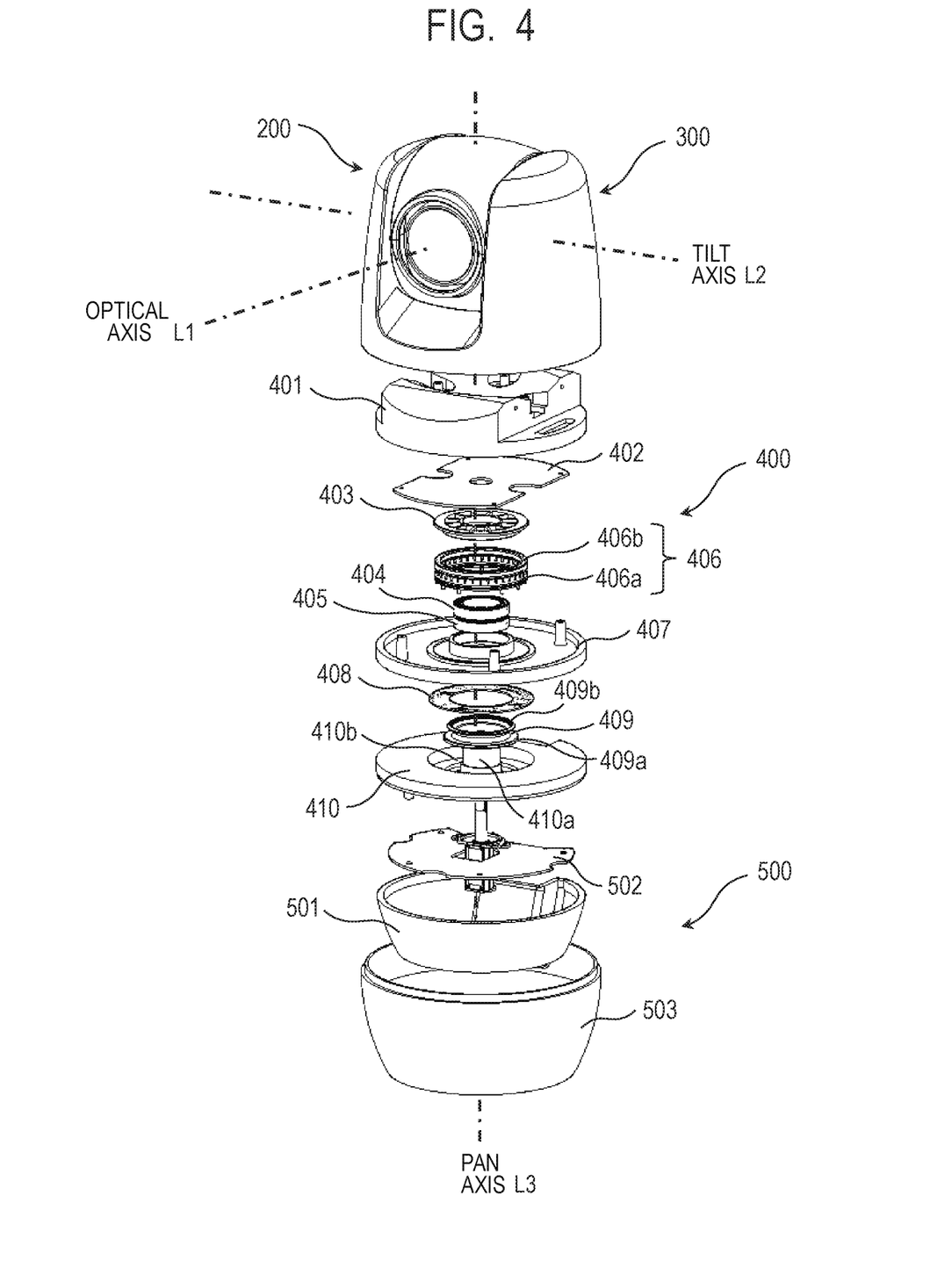
FIG. 4 is an exploded view illustrating a schematic configuration of a pan unit in the imaging apparatus illustrated in FIG. 1.
Figure 5:
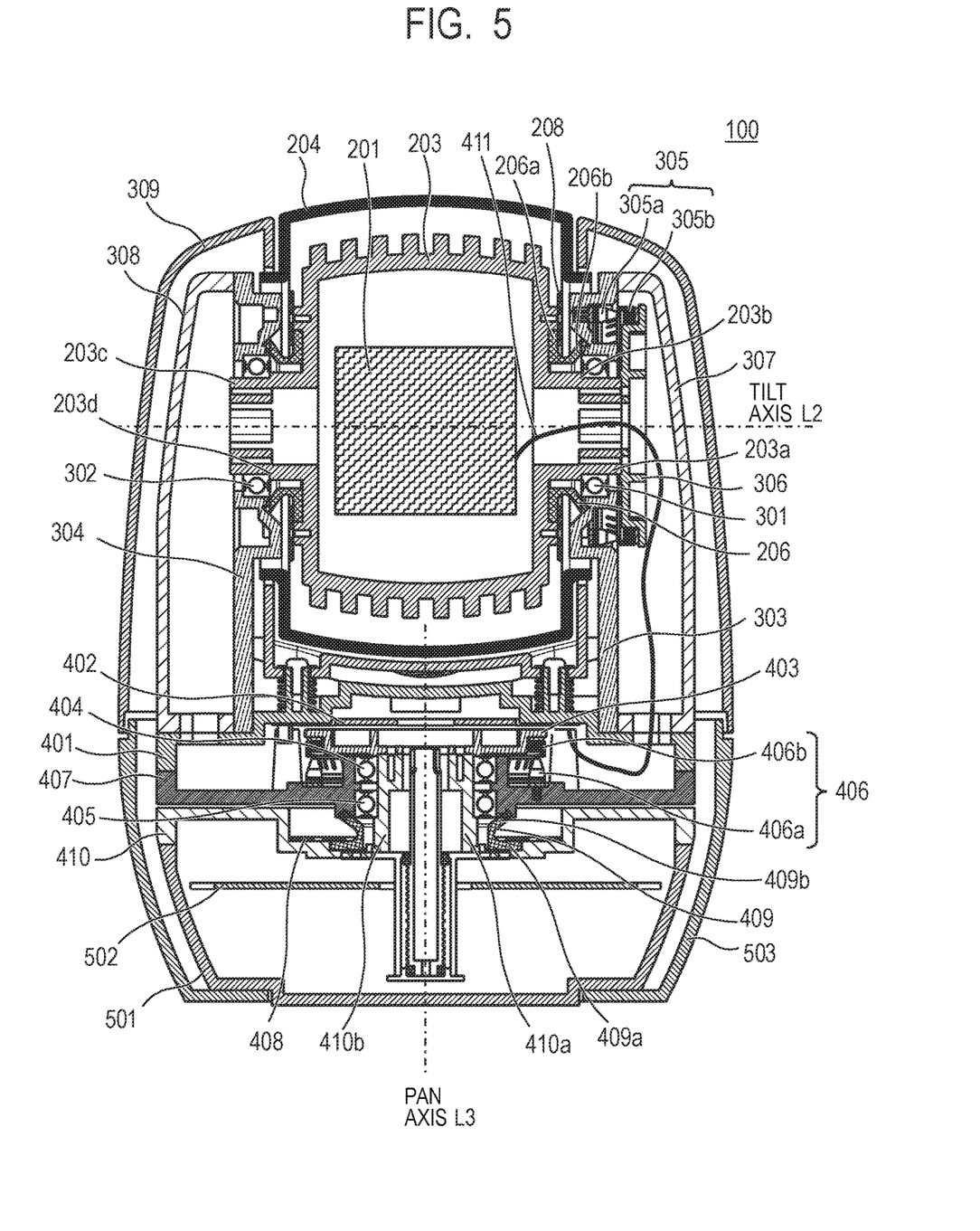
FIG. 5 is a sectional view in a pan axis direction illustrating a schematic configuration of the imaging apparatus illustrated in FIG. 1.

Hereinafter, the embodiment of the present invention will be described with reference to FIGS. 1 to 5. FIG. 1 illustrates an external view of an imaging apparatus 100 according to one embodiment of the present invention. Further, FIG. 2 illustrates an exploded view of a camera unit 200 in the imaging apparatus 100, FIG. 3 illustrates an exploded view of a tilt unit 300, and FIG. 4 illustrates an exploded view of a pan unit 400 and a bottom unit 500. Further, FIG. 5 illustrates a sectional view in a pan axis direction of the imaging apparatus 100.

The imaging apparatus 100 includes the camera unit 200, the tilt unit 300, the pan unit 400 and the bottom unit 500. The camera unit 200 actually includes an optical system, an imaging element and the like of a camera not illustrated for photographing a target that exists in an optical axis L1 direction. The tilt unit 300 supports the camera unit 200, and rotates the camera unit 200 around a tilt axis L2. The pan unit 400 (see FIG. 3) supports the tilt unit 300 as described later, and rotates the tilt unit 300 and the camera unit 200 around a pan axis L3. The bottom unit 500 substantially contains the pan unit 400 internally, and is a fixing section at a time of mounting the imaging apparatus 100 to a wall surface or a ceiling. Hereinafter, the respective units will be described with reference to the drawings.

<Camera Unit 200>

First, with reference to FIG. 2 and FIG. 5, the camera unit 200 will be described. In the present embodiment, the camera unit 200 includes a lens barrel 201, a front case 202, a rear case 203, and camera covers 204a and 204b. The lens barrel 201 including an imaging element is covered with a camera case including the front case 202 and the rear case 203. At both ends in a tilt axis L2 direction of the camera case, hollow shafts to be tilt rotation shafts 203a and 203c are integrally molded at the rear case 203. The tilt rotation shafts 203a and 203c are provided with stepped portions 203b and 203d that are formed by diameters being reduced in a predetermined distance from the rear case 203.

In the present embodiment, substantially annular slide packings 206 and 207 that present a waterproof function are disposed on both side surfaces of the camera case coaxially with the tilt rotation shafts 203a and 203c in such a manner as to wind around the tilt rotation shafts 203a and 203c. In more detail, the slide packing 206 (207) has a substantially cylindrical shape, and has flange portions 206a and 206b that are projected outward in both end portions of the substantially cylindrical shape. The case side flange portion 206a that is located at a camera case side forms a flat portion that can abut on a camera case side surface where the tilt rotation shaft 203a protrudes. The bearing side flange portion 206b that is located at an opposite side to the case side flange portion 206a has a shape that projects outside of an outer ring of a bearing 301 that will be described later.

The slide packings 206 and 207 are fixed to the camera case by the bearing side flange portion (206b) being sandwiched (see FIG. 5) by annular packing pressers 208 and 209 and the camera case side surfaces. The camera case has a part of an exterior covered with the camera cover including the upper cover 204a and the lower cover 204b. A connection surface of the front case 202 and the rear case 203 is kept watertight by a waterproof unit not illustrated such as a packing. The camera case is a molded product by aluminum die casting, for example, and includes sufficient rigidity not to deform against reaction forces of the slide packings 206 and 207 and a ring USM 305 that will be described later. Further, the camera unit 200 can photograph the optical axis L1 direction which is exposed.

<Tilt Unit 300>

Next, with reference to FIG. 3 and FIG. 5, the tilt unit 300 will be described. In the present embodiment, the tilt unit 300 includes bearings 301 and 302, tilt support members 303 and 304, the ring USM 305, a presser plate 306, side covers 307 and 308, and a top cover 309. The tilt unit 300 supports the aforementioned camera unit 200 to be rotatable around the tilt axis L2 by the bearings 301 and 302. Further, turning of the camera unit 200 around the tilt axis L2 is controlled by the ring USM 305. Hereinafter, details of the tilt unit 300 will be described.

The tilt rotation shafts 203a and 203c of the camera case are inserted into the bearings 301 and 302, and respective inner rings of the bearings 301 and 302 are inserted to positions where the inner rings are butted to the stepped portions 203b and 203d. The outer rings of the bearings 301 and 302 are supported by being fitted into through-holes provided in the tilt support members 303 and 304. Note that these tilt support members 303 and 304 are fixed to a tilt base 401 that will be described later (see FIG. 4 and FIG. 5). Thereby, the camera unit 200 is supported rotatably around the tilt axis L2 with respect to the tilt base 401 by the tilt support members 303 and 304.

The ring USM 305 includes an annular stator 305a that includes a signal line for driving, and an annular rotor 305b that is rotationally driven relatively to the stator 305a. Further, the ring USM 305 is disposed on a side surface at an opposite side to the camera unit 200, on the tilt support member 303, to be coaxial with the tilt rotation shaft 203a. The presser plate 306 is fixed to the tilt rotation shaft 203a while compressing the ring USM 305 in the tilt axis L2 direction. Therefore, as a result, the ring USM 305 is sandwiched by the tilt support member 303 and the presser plate 306.

At this time, the stator 305a is disposed at a tilt support member 303 side, and the rotor 305b is disposed at a presser plate 306 side. Further, the stator 305a is connected to a control substrate 402 that will be described later with a signal line 411 (see FIG. 5). By driving the stator 305a in response to a control signal from the control substrate 402, the rotor 305b rotates around the tilt axis L2. In other words, the rotor 305b, the presser plate 306 and the camera unit 200 are rotatable around the tilt axis L2, with respect to the tilt support member 303 and the stator 305a, and a tilt operation is enabled.

Note that a force with which the presser plate 306 compresses the ring USM 305 is sufficiently large for the ring USM 305 to exhibit a force that causes the camera unit 200 to perform tilt rotation. If a compression force that is applied to the ring USM 305 is excessively large, there arises a possibility that the stator 305a cannot drive the rotor 305b and causes a rotational operation failure. Further, if the compression force that is applied to the ring USM 305 is excessively small, there arises a possibility that the stator 305a causes slip to the rotor 305b, cannot transmit a rotational force and causes a rotational operation failure. It is well known that the compression force in the axial direction which is applied to the ring USM 305 is important for the ring USM 305 to exhibit a desired drive torque and stop position accuracy, and therefore detailed explanation is omitted here.

Here, the tilt support members 303 and 304 include sufficient rigidity so as to be difficult to deform even when the tilt support members 303 and 304 compress the ring USM 305 and the slide packings 206 and 207, by being formed by aluminum die casting, for example.

The slide packing 206 which is fixed onto the camera case by the packing presser 208 is disposed so that the tilt rotation shaft 203a is located inside of the substantially cylindrical shape, in a side surface at a camera unit 200 side, of the tilt support member 303. The bearing side flange portion 206b in the slide packing 206 abuts on the tilt support member 303 around an outer periphery of the bearing 301. A position of the abutment is located inside of the ring USM 305.

To the slide packing 206, a compression force is applied by an abutment surface on the case side flange portion 206a of the camera case, and an abutment surface on the bearing side flange portion 206b, of the tilt support member 303. The compression force to the slide packing 206 needs to be sufficiently large to prevent raindrops/dust from entering from between the camera case and the tilt support member 303. If the compression force that is applied to the slide packing 206 is excessively large, slide resistance becomes large, so that there is a possibility that the camera unit 200 causes a rotation operation failure. If the compression force that is applied to the slide packing 206 is excessively small, the slide packing 206 deforms when external pressure is applied to the slide packing 206, and there is a possibility that raindrops/dust enter an inside from a gap that is generated in a slide surface. It is well-known that the compression force which is applied to the slide packing 206 is important for the slide packing 206 to exhibit desired seal performance, so that detailed explanation is omitted here.

The slide packing 206 adds an urging force in a direction to separate from the camera case to the tilt support member 303. In contrast with this, the ring USM 305 adds an urging force in a direction to cause the tilt support member 303 to approach the camera case to the tilt support member 303 by the compression force which is applied by the presser plate 306 which is fixed to the tilt rotation shaft 203a. Here, in the present embodiment, the compression force which is applied to the ring USM 305 is made larger than the compression force which is applied to the slide packing 206. Consequently, due to a difference between the compression forces, an urging force works on the tilt support member 303 in the direction to cause the tilt support member 303 to approach the camera case. However, the bearing 301 is fastened to a stepped portion (not illustrated) that is provided in the tilt support member 303 with a clearance fit, and the tilt support member 303 is positioned to the stepped portion 203b by the bearing 301. Accordingly, even if the bearing 301 is not fixed to the tilt support member 303, a positional relationship between the tilt support member 303 and the camera case is always kept constant by the urging force in the direction to cause the tilt support member 303 to approach the camera case.

The side covers 307 and 308 are respectively fixed to the tilt support members 303 and 304 with packings not illustrated between the side cover 307 and the tilt support member 303, and between the side cover 308 and the tilt support member 304. Outer sides (surfaces at opposite sides to the camera cover) of the tilt support members 303 and 304 are covered with the side covers 307 and 308, and thereby the ring USM 305 and the presser plate 306 are covered while the connection surface is kept watertight. Further, the tilt base 401 and the tilt support members 303 and 304, and the side covers 307 and 308 are covered with the top cover 309, and thereby the tilt unit 300 is protected.

The top cover 309 and part of the camera cover (204a, 204b) have a loose fitting structure in the tilt axis L2 direction. Consequently, a jet stream passing through a gap between the top cover 309 and the camera cover 204 does not directly reach gaps between the camera case, and the tilt support members 303 and 304. Accordingly, the jet stream is decompressed before reaching the gaps, and large water pressure is not applied to the slide packings 206 and 207.

As described above, in spaces between the tilt support members 303 and 304, and the camera case, which are gaps between fixed sides and a drive side at a time of tilt operation, the slide packings 206 and 207 are placed to separate an inside and an outside of the slide packings 206 and 207 spatially. Therefore, raindrops/dust that enter the gaps do not reach a case internal space where the bearings 301 and 302 and the ring USM 305 are disposed by a seal operation of the slide packings 206 and 207.

Further, the slide packing 206 slides inside of the ring USM 305 to the tilt rotation shaft 203a. Therefore, frictional torque generated by the slide packing 206 at the time of tilt operation can be decreased.

Further, in order for the ring USM 305 to exhibit sufficient drive torque to cause the camera to perform a tilt operation, and the stop position accuracy, a rotor compression amount is important. Likewise, in order for the slide packing 206 to exhibit sufficient seal performance to protect the camera case and an imaging element and the like in the camera case from raindrops/dust, the compression amount of the slide packing 206 is important. According to the present embodiment, by changing shapes of a fixing surface of the ring USM 305 on the tilt support member 303 and the presser plate 306, the compression amount (rotor compression amount) of the ring USM 305 can be adjusted. At this time, a reaction force from the ring USM 305 is transmitted to the tilt rotation shaft 203a through the presser plate 306. Therefore, a force to pull the tilt rotation shaft 203a outward in the tilt axis direction changes. However, in the present embodiment, the tilt rotation shaft 203a is unchangeable in the tilt axis L2 direction in the position where the stepped portion 203b is butted to the bearing 301. Accordingly, the gap in the tilt axis L2 direction between the camera case and the tilt support member 303 does not change, and the compression amount of the slide packing 206 does not change.

Likewise, by changing shapes of the case side flange portion 206a of the slide packing 206 on the camera case, and the bearing side flange portion 206b that abuts on the slide surface of the tilt support member 303, the compression amount of the slide packing 206 can be changed. At this time, a reaction force from the slide packing 206 is set to be sufficiently smaller than a reaction force from the ring USM 305. Therefore, even if the bearing 301 moves with respect to the tilt rotation shaft 203a, an urging force toward the stepped portion 203b is applied to the bearing 301. Accordingly, the tilt rotation shaft 203a becomes unchangeable in the tilt axis L2 direction in a position where the stepped portion 203b is butted against the bearing 301. Accordingly, a positional relationship of the stepped portion 203b, the tilt support member 303, and the presser plate 306 does not change, and change of the compression amount of the slide packing 206 does not influence the compression amount (rotor compression amount) of the ring USM 305.

By adopting the above configuration, the respective compression amounts can be individually managed without the slide packing 206 and the ring USM 305 influencing each other, within a range of the state where the compression force that is applied to the ring USM 305 is larger than the compression force that is applied to the slide packing 206. In other words, after the compression amount is adjusted so that the slide packing 206 can exhibit sufficient seal performance, the ring USM 305 can be adjusted to be able to exhibit sufficient drive torque and stop position accuracy. Contrariwise, after the compression amount of the ring USM 305 is adjusted, the compression amount of the slide packing 206 can also be adjusted.

<Pan Unit 400>

Hereinafter, with reference to FIG. 4 and FIG. 5, the pan unit 400 will be described. In the present embodiment, the pan unit 400 includes the tilt base 401, the control substrate 402, a presser plate 403, bearings 404 and 405, a ring USM 406, a pan base 407, a packing presser 408, a slide packing 409, and a bottom plate 410. On a top surface of the tilt base 401, the pair of tilt support member 303 and 304 described above are fixed in such a manner that surfaces that support the bearings 301 and 302 are faced to each other.

The tilt base 401 is fixed to the pan base 407 in a state where a connection surface is kept watertight by a packing not illustrated. The pan base 407 has a through-hole, and outer rings of the bearings 404 and 405 are fitted and supported in the through-hole. In the bottom plate 410, a hollow shaft to be a pan rotation shaft 410a is integrally molded in a pan axis L3 direction. The pan rotation shaft 410a is provided with a stepped portion 410b that is formed by a diameter reducing in a predetermined distance from the bottom plate 410, and has a diameter enlarging as seen from an end portion direction of the pan rotation shaft.

The bearings 404 and 405 are fitted over the pan rotation shaft 410a so that an inner ring of the bearing 405 which is disposed at a stepped portion 410b side is butted to the stepped portion 410b. By being configured in this way, the pan base 407 is rotatably supported by the bottom plate 410 through the bearings 404 and 405.

In the present embodiment, the slide packing 409 in a substantially annular shape which presents a waterproof function is disposed to be wound around the pan rotation shaft 410a coaxially with the pan axis L3 at a pan base 407 side on the bottom plate 410. In more detail, the slide packing 409 has a substantially cylindrical shape, and has flange portions 409a and 409b that are projected outward in both end portions of the substantially cylindrical shape. The bottom side flange portion 409a that is located at a bottom plate 410 side forms a flat portion that can abut on a flat surface at the bottom plate 410 side where the pan rotation shaft 410a protrudes. The bearing side flange portion 409b that is located at an opposite side to the bottom side flange portion 409a has a shape that is projected outside of an outer ring of the bearing 405. The slide packing 409 is fixed to the bottom plate 410 by the bottom side flange portion 409a being sandwiched by the packing presser 408 and the bottom plate 410 (see FIG. 5)

The ring USM 406 includes an annular stator 406a that includes a signal line for drive, and an annular rotor 406b that is rotationally driven relatively to the stator 406a. Further, the ring USM 406 is disposed at a camera unit 200 side on the pan base 407 to be coaxial with the pan rotation shaft 410a. The presser plate 403 is fixed to the pan rotation shaft 410a while compressing the ring USM 406 in the pan axis L3 direction. Therefore, as a result, the ring USM 406 is sandwiched by the pan base 407 and the presser plate 403.

At this time, the stator 406a is disposed at a pan base 407 side, and the rotor 406b is disposed at a presser plate 403 side. The stator 406a is connected to the control substrate 402 which is mounted on the pan base 407 by the signal line 411. The stator 406a is driven in response to a control signal from the control substrate 402, and thereby the stator 406a relatively rotates around the pan axis L3 with respect to the rotor 406b. In other words, the stator 406a, the pan base 407, the tilt unit 300, and the camera unit 200 are rotatable around the pan axis L3 with respect to the bottom plate 410, the presser plate 403, and the rotor 406b, and a pan operation is enabled. Note that the signal line 411 is also actually connected to other components than the component the connection with which is illustrated, but only a minimum wiring state is illustrated in the drawing so that visual confirmation of the drawing is not reduced.

Note that a force with which the presser plate 403 compresses the ring USM 406 is set at a sufficient magnitude for the ring USM 406 to exhibit a force to cause the camera unit 200 to perform pan rotation. Note that it is well known that the compression force in the pan axis L3 direction which is applied to the ring USM 406 is important for the ring USM 406 to exhibit desired drive torque and stop position accuracy, and therefore explanation here is omitted.

Here, the pan base 407 and the bottom plate 410 include sufficient rigidity not to deform even when the pan base 407 and the bottom plate 410 compress the ring USM 406 and the slide packing 409, by being formed by aluminum die casting, for example.

The slide packing 409 that is fixed onto the bottom plate 410 by the packing presser 408 is disposed so that the pan rotation shaft 410a is located inside of the substantially cylindrical shape, in a bottom plate 410 side surface of the pan base 407. The bearing side flange portion 409b in the slide packing 409 abuts on a facing surface of the pan base 407 around an outer periphery of the bearing 405. The abutment position is located inside of the ring USM 406 with respect to the pan axis L3.

A compressions force is applied to the slide packing 409 by an abutment surface of the bearing side flange portion 409b in the facing surface to the bottom plate 410, of the pan base 407, and an abutment surface onto the bottom side flange portion 409a, of the bottom plate 410. The compression force to the slide packing 409 needs to have a sufficient magnitude to prevent raindrops/dust from entering from between the pan base 407 and the bottom plate 410. It is well known that the compression force of the slide packing 409 is important for the slide packing 409 to exhibit desired seal performance, and therefore explanation here is omitted.

By the slide packing 409, an urging force in the direction to separate from the bottom plate 410 is applied to the pan base 407. In this relation, the ring USM 406 applies an urging force in a direction to causes the pan base 407 to approach the bottom plate 410 to the pan base 407 by the compression force which is applied from the presser plate 403 which is fixed to the pan rotation shaft 410a. Here, in the present embodiment, the compression force which is applied to the ring USM 406 is made larger than the compression force which is applied to the slide packing 409. Therefore, due to a difference between the compression forces, an urging force in the direction to cause the pan base 407 to approach the bottom plate 410 works on the pan base 407. However, the pan base 407 is positioned to the stepped portion 410b by the bearing 405. Accordingly, even when the bearing 405 is not fixed to the pan base 407, a positional relationship between the pan base 407 and the bottom plate 410 is always kept constant by the urging force in the direction to cause the pan base 407 to approach the bottom plate 410.

<Bottom Unit 500>

Hereinafter, with reference to FIG. 4 and FIG. 5, the bottom unit 500 will be described. In the present embodiment, the bottom unit 500 includes a bottom case 501, a power supply substrate 502, and a bottom cover 503.

The bottom plate 410 is fixed to the bottom case 501 in a state of keeping a connection surface watertight by a packing not illustrated. The power supply substrate 502 for supplying power is mounted to an inside of the bottom case 501. By mounting the bottom cover 503 onto the bottom case 501, the bottom case 501 is covered with the bottom cover 503. The bottom case 501 or the bottom cover 503 can install and fix an imaging apparatus 100 main body onto a ceiling or a wall by using a fixing screw not illustrated.

The top cover 309 and a part of the bottom cover 503 have a loose fitting structure in the pan axis L3 direction. Therefore, a jet stream that passes through a gap between the top cover 309 and the bottom cover 503 does not directly reach a gap between the pan base 407 and the bottom plate 410.

Accordingly, the jet stream is decompressed before reaching the gap, and large water pressure is not applied to the slide packing 409.

As described above, in a space between the pan base 407 and the bottom plate 410, which is a gap between the fixed side and the drive side at the time of a pan operation, the slide packing 409 is placed and separates an inside and an outside of the slide packing 409 spatially. Consequently, raindrops/dust that enter the gap does not reach the case internal space in which the bearings 404 and 405 and the ring USM 406 are disposed by a seal operation of the slide packing 409.

Further, the slide packing 409 slides inside of the ring USM 406 with respect to the pan rotation shaft 410a. Therefore, frictional torque that is generated by the slide packing 409 at the time of a pan operation can be reduced, as compared with the case of the conventional configuration in which a packing is placed outside of the ring USM.

Furthermore, the rotor compression amount is important for the ring USM 406 to exhibit sufficient drive torque to cause the camera to perform a pan operation and the stop position accuracy. Likewise, the compression amount of the slide packing 409 is important for the slide packing 409 to exhibit sufficient seal performance to protect the mechanism that causes the camera to perform pan rotation and the like from raindrops/dust. According to the present embodiment, by changing a shape of a fixing surface for the ring USM 406 on the pan base 407, and a shape of the presser plate 403, the compression amount of the ring USM 406 can be adjusted. At that time, a reaction force from the ring USM 406 is transmitted to the pan rotation shaft 410a through the presser plate 403. Therefore, a force to pull the pan rotation shaft 410a to the camera unit 200 side changes. However, in the present embodiment, the pan rotation shaft 410a is unchangeable in the pan axis L3 direction in a position where the stepped portion 410b is butted against the bearing 405. Accordingly, the gap in the pan axis L3 direction between the pan base 407 and the bottom plate 410 does not change, and the compression amount of the slide packing 409 does not change.

Likewise, by changing the shapes of the bottom side flange portion 409a of the slide packing 409 on the bottom plate 410, and the bearing side flange portion 409b that abuts on the slide surface of the pan base 407, the compression amount of the slide packing 409 can be changed. At this time, the reaction force from the slide packing 409 is set to be sufficiently smaller than the reaction force from the ring USM 406. Therefore, even when the bearing 405 works onto the pan rotation shaft 410a, the urging force toward the stepped portion 410b is applied to the bearing 405. Therefore, the pan rotation shaft 410a is unchangeable in the pan axis L3 direction in the position where the stepped portion 410b is butted against the bearing 405. Accordingly, the positional relationship of the stepped portion 410b, the pan base 407, and the presser plate 403 does not change, and a change of the compression amount of the slide packing 409 does not influence the compression amount of the ring USM 406.

By adopting the above configuration, the slide packing 409 and the ring USM 406 do not influence each other, and the respective compression amounts can be individually managed. In other words, after the compression amount is adjusted so that the slide packing 409 can exhibit sufficient seal performance, the ring USM 406 can be adjusted so as to be able to exhibit sufficient drive torque and stop position accuracy. Further, contrariwise, after the compression amount of the ring USM 406 is adjusted, the compression amount of the slide packing 409 can also be adjusted.

As described above, in the present invention, the structure that enhances the waterproof effect is given in the imaging apparatus. For example, concerning the tilt rotation shaft, the camera unit 200, the rotation shaft, the bearing 301, the base member, the presser member, the ultrasonic motor, and the waterproof unit (slide packing 206) are included. The camera unit 200 includes the imaging element. The rotation shaft which is exemplified by the tilt rotation shaft 203a functions as the rotation shaft of the camera unit 200, and is supported rotatably around the tilt axis L2 by the bearing 301. The base member which is exemplified by the tilt support member 303 supports the bearing 301 by having the outer ring of the bearing 301 fitted in the tilt support member 303. The presser member exemplified by the presser plate 306 is fixed to the tilt rotation shaft 203a, preferably, to an end portion of the tilt rotation shaft 203a. The ultrasonic motor (ring USM 305) is disposed on a same axis as the tilt rotation shaft 203a, and has the rotor 305b which is brought into pressure contact with the presser plate 306 and the stator 305a which is brought into pressure contact with the tilt support member 303. The waterproof unit exemplified by the slide packing 206 is disposed between the tilt support member 303 and the camera unit 200. The camera unit 200, the slide packing 206, the tilt support member 303, the ring USM 305 and the presser plate 306 are disposed in the rotation axis direction in this order. By adopting the disposition like this, the aforementioned waterproof effect can be obtained. Note that the waterproof effect described in the present description does not mean prevention of entry of water according to the working, but refers to an effect of enhancing the function of preventing entry of water.

Note that as the configuration for obtaining the waterproof effect concerning the aforementioned tilt rotation shaft, the camera covers 204a and 204b and the side cover 307 can be further included. The camera covers 204a and 204b cover the camera unit 200 and rotate integrally with the camera unit 200. The side cover 307 covers the tilt support member 303. Further, the camera covers 204a and 204b can be loosely fitted to a bore portion in which the tilt rotation shaft 203a and related components are inserted in the side cover 307 so as to be fitted in to be capable of turning or the like in the rotation axis direction. By placing the respective covers in this way, exposure of the components concerning the tilt rotation shaft to the external space can be avoided. In the embodiment, the camera covers 204a and 204b are inserted into the bore portion of the side cover 307, but may be reversed. In other words, the camera covers 204a and 204b, and the side cover 307 can be structured to be loosely fitted to one another.

As described above, the ring USM 305 is sandwiched between the presser plate 306 and the tilt support member 303. Further, the slide packing 206 is sandwiched between the camera unit 200 and the tilt support member 303. At this time, in the sandwiching, the compression force in the rotation axis direction which is applied to the ring USM 305 can be larger than the compression force in the rotation axis direction which is applied to the slide packing 206. By setting the compression forces in this way, the positional relationship between the bearing 301 and the camera unit 200 is stabilized, and the stable rotational force by the ring USM 305 can be provided.

Further, the aforementioned structure includes the tilt unit 300, the base member, the bearing 405, the rotation shaft, the fixing portion, the presser member, the ultrasonic motor, and the waterproof unit, with respect to the pan rotation shaft, for example. The tilt unit 300 includes the camera unit 200 including the imaging element. To the base member exemplified by the pan base 407, the tilt unit 300 is mounted, and thereby the camera unit 200 is indirectly mounted. The bearing 405 supports the pan base 407 rotatably around the pan axis L3. The rotation shaft exemplified by the pan rotation shaft 410a supports the bearing 405 rotatably around the pan axis L3 and functions as a center of rotation of the tilt unit 300. Further, the pan rotation shaft 410a is fixed to the fixing portion exemplified by the bottom plate 410. The presser member exemplified by the presser plate 403 is fixed to the pan rotation shaft 410a, preferably to an end portion of the pan rotation shaft 410a. The ultrasonic motor (ring USM 406) is disposed on a same axis as the pan rotation shaft 410a, and has the rotor 406b which is brought into pressure contact with the presser plate 403, and the stator 406a which is brought into pressure contact with the pan base 407. The waterproof unit exemplified by the slide packing 409 is disposed between the bottom plate 410 and the pan base 407. The presser plate 403, the ring USM 406, the pan base 407, the slide packing 409, and the bottom plate 410 are disposed in the rotational axis direction in this order. By adopting the disposition like this, the aforementioned waterproof effect can be obtained.

Note that as the components for obtaining the waterproof effect concerning the pan rotation shaft described above, the camera side cover member and the cover member for fixing portion can be further included. The camera side cover member exemplified by the top cover 309 covers the presser plate 403, the ring USM 406, the pan base 407, and the slide packing 409. Further, the cover member for fixing portion exemplified by the bottom case 501 covers the bottom plate 410. Further, the top cover 309 and the bottom case 501 can have a loose fitting structure to each other in the direction of the pan axis L3 which is the rotation axis. By configuring the top cover 309 and the bottom case 501 in this way, exposure of the components concerning the pan rotation shaft to the external space is avoided.

Further, as described above, the ring USM 406 is sandwiched between the presser plate 403 and the pan base 407. Further, the slide packing 409 is sandwiched between the pan base 407 and the bottom plate 410. At this time, in the sandwiching, the compression force in the rotation axis direction which is applied to the ring USM 406 can be larger than the compression force in the rotation axis direction which is applied to the slide packing 409. By setting the compression forces in this way, the positional relationship between the bearing 405 and the bottom plate 410 is stabilized, and a stable rotational force by the ring USM 406 can be provided.

Note that in both of the mechanism concerning the tilt rotation and the mechanism concerning the pan rotation described above, the rotation shafts (203a, 410a) can have the stepped portions 203b and 410b in which the diameters change. The bearings 301 and 405 abut on the stepped portions 203b and 410b, and thereby the positions where the bearings 301 and 405 support the rotation shafts (203a, 410a) are defined.

As described above, the waterproof unit includes the slide packings 206 and 409 in the cylindrical shapes that have one end portions fixed, and the other end portions slide with respect to the members on which the other end portions abut. In the present embodiment, the ring USMs 305 and 406 achieve simplification of the structure and reduction in size by having the ring shapes. However, in response to the use situation, ultrasonic motors in other shapes can also be used. Further, diameters from the centers of rotation of the respective components to slide portions of the corresponding slide packings 206 and 409 are set to be smaller than radiuses of insides of the ring shapes of the ring USMs 305 and 406. By disposing the respective components relating to rotation as described above, the setting is enabled, the frictional torque at the time of rotating the members that abut on the slide packings 206 and 409 can be kept small, and loads to the ring USMs 305 and 406 can be reduced. Note that the modes of the slide packings 206 and 409 can be the aforementioned modes, but the shapes and the like of both the flange portions are not limited to the embodiment as long as the equivalent operation is obtained.

Further, as the structure that enhances the waterproof effect in the aforementioned imaging apparatus, the imaging apparatus includes the photographing section, the rotation shaft, the bearing, the support member, the ultrasonic motor, and the slide packing. For example, the photographing section exemplified by the camera unit 200 has the imaging element. Further, the rotation shaft exemplified by the tilt rotation shaft 203a becomes the center of rotation at the time of rotating the camera unit 200. The tilt rotation shaft 203a is supported rotatably around the tilt axis L2 by the bearing 301, for example, the bearing 301 is supported by the support member exemplified by the tilt support member 303. The ultrasonic motor exemplified by the ring USM 305 supplies a rotational force for causing the camera unit 200 to perform tilt rotation. In the slide packing 206, one end surface (case side flange portion 206a) abuts on and is fixed to a surface to which the tilt rotation shaft 203a of the camera case protrudes. Further, the end surface (bearing side flange portion 206b) at the tilt support member 303 side slidably abuts on the outer periphery of the bearing 301 in the tilt support member 303. Further, the slide packing 206 has a cylindrical portion that connects the case side flange portion 206a and the bearing side flange portion 206b. By placing the slide packing 206 like this between a flat surface of the camera case and a facing surface to the flat surface, of the tilt support member 303, the waterproof effect can be enhanced, and the components for rotation of the camera unit which is exemplified by tilt rotation can be made compact.

Note that in the imaging apparatus including the aforementioned structure, the ring USM 305 is disposed coaxially with the tilt rotation shaft 203a. Further, the presser member (presser plate 306) which is fixed to the tilt rotation shaft 203a can be further included, the rotor 305b of the ring USM 305 can be brought into pressure contact with one of the presser member and the tilt support member 303, and the stator 305a can be brought into pressure contact with the other one. Further, the diameter of the bearing side flange portion 206b which is the other end surface of the slide packing 206 is set to be smaller than an inside diameter of the ring USM 305. Thereby, the frictional torque at the time of rotating the members which abut on the slide packings 206 and 409 can be kept small, and the loads to the ring USMs 305 and 406 can be reduced. Further, the tilt rotation shaft 203a has the stepped portion 203b in which the diameter changes, the bearing 301 abuts on the stepped portion 203b and thereby the position where the bearing 301 supports the tilt rotation shaft 203a is defined. Further, the slide packing 206 is disposed so that in the tilt rotation shaft 203a, the region having a large diameter due to formation of the stepped portion 203b is located inside of the cylindrical portion. The tilt rotation shaft 203a freely rotates inside of the cylindrical shape, and thereby the frictional torque which is received by the mechanism required to perform tilt rotation from the slide packing 206 is only torque caused by sliding.

Note that the configuration of the present invention described above can also be grasped as the waterproof effect enhancing structure that enhances the waterproof effect in the imaging apparatus, for example. The structure includes the section to be turned, the rotation shaft, the bearing, the support member, the ultrasonic motor, and the slide packing. For example, the camera unit 200 corresponds to the section to be turned, and the tilt rotation shaft 203a corresponds to the rotation shaft that is the center of rotation at the time of turning the section to be turned. The bearing 301 corresponds to the bearing that rotatably supports the rotation shaft, the tilt support member 303 corresponds to the support member which supports the bearing, and the USM 305 corresponds to the ultrasonic motor that supplies the rotational force that turns the section to be turned. The slide packing is exemplified by the slide packing 206 having the cylindrical portion, one end surface is fixed to the surface where the rotation shaft protrudes, and the other end surface slidably abuts on the outer periphery of the bearing in the support member.

By having the waterproof effect enhancing structure of the configuration like this, in the imaging apparatus according to the present invention, the packing around the rotation shaft can be stored inside of the ultrasonic motor with respect to the rotation shaft. Consequently, the frictional torque of the packing in the tilt rotation operation can be reduced, and the ultrasonic motor with a small diameter can be used, which results in reduction in size of the imaging apparatus main body. Further, the compression amount of the ultrasonic motor can be adjusted between the base member and the presser member, and the compression amount of the packing can be adjusted between the base member and the camera case or the fixing portion. Consequently, the respective compression amounts can be individually managed. By adjusting the compression amount, the ultrasonic motor can exhibit the sufficient drive torque to drive the camera and the stop position accuracy. Further, the packing can exhibit sufficient seal performance to keep sealability of the inside of the camera case from raindrops/dust.

The present invention is described in detail based on the exemplary embodiment thus far, but the present invention is not limited to the specific embodiment, and various modes within the range without departing from the gist of the invention are also included in the present invention. A part of the aforementioned embodiment may be arbitrarily used without carrying out all of the aforementioned embodiment. For example, the slide packing according to the present invention is used in only the tilt rotation mechanism, and the conventional waterproof mechanism can also be used in the pan rotation mechanism, or can be reversed. The present waterproof structure is desirably placed in each of both the rotation shafts of tilt and pan, but may be placed in only one of the rotation shafts in accordance with the required stop accuracy or the like. Even with the configuration like this, the waterproof performance which is to be achieved by the present invention can also be obtained partially.

As for the slide packing, an O-shaped ring or oil seal may be used if waterproof is achieved by compression in the rotation axis direction. The tilt rotation shaft 203a is molded integrally with the camera case, but may be made a separate component. Likewise, the pan rotation shaft 410a is molded integrally with the bottom plate 410, but may be made a separate component. As for the stepped portions 203b, 203d and 410b, separate components which are retaining rings or stoppers may be used, as long as the positions in the axial direction of the bearings are determined by butting the bearings. Adjustment of the compression amounts of the ring USMs 305 and 406 may be performed by inserting and extracting spacers to and from between the presser plate 306 and the tilt rotation shaft 203a, and between the presser plate 403 and the pan rotation shaft 410a. In a wire connection method between the lens barrel 201 and the control substrate 402, and a wire connection method between the control substrate 402 and the power supply substrate 502, a thin coaxial line, FFC, FPC, or slipring can be used in accordance with a pan/tilt rotation angle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-206395, filed Nov. 1, 2018, and Japanese Patent Application No. 2019-162217, filed Sep. 5, 2019, which are hereby incorporated by reference herein in their entirety.

What is claimed is:

1. An imaging apparatus, comprising:
a camera unit rotatable in a tilt direction;
a rotation shaft that is a center of rotation of the camera unit;
a base member that supports the rotation shaft;
an ultrasonic motor that is disposed on a same axis as the rotation shaft, and drives the camera unit in the tilt direction;
a presser member that brings the ultrasonic motor into pressure contact with the base member, wherein the ultrasonic motor is sandwiched between the presser member and the base member; and
a waterproof member that is sandwiched between the base member and the camera unit, wherein
a compression force in a rotation axis direction that is applied to the ultrasonic motor when the ultrasonic motor is sandwiched between the presser member and the base member is different from a compression force in the rotation axis direction which is applied to the waterproof member when the waterproof member is sandwiched between the camera unit and the base member.

2. The imaging apparatus according to claim 1, further comprising:
a camera cover that covers the camera unit and rotates integrally with the camera unit; and
a cover member that covers the base member, wherein the camera cover is mutually fitted to the cover member in the rotation axis direction.

3. The imaging apparatus according to claim 1, wherein the compression force in the rotation axis direction that is applied to the ultrasonic motor when the ultrasonic motor is sandwiched between the presser member and the base member is larger than the compression force in the rotation axis direction which is applied to the waterproof member when the waterproof member is sandwiched between the camera unit and the base member.

4. The imaging apparatus according to claim 1, wherein the ultrasonic motor includes a rotor and a stator, and the stator is disposed closer to the camera unit side than the rotor.

5. The imaging apparatus according to claim 1, wherein the rotation shaft has a stepped portion in which a diameter changes, a bearing abuts on the stepped portion, and thereby a position where the bearing supports the rotation shaft is defined.

6. The imaging apparatus according to claim 1, wherein the waterproof member comprises a cylindrical slide packing in which one end portion is fixed, and the other end portion slides to a member on which the other end portion abuts, the ultrasonic motor has a ring shape, and a diameter from the center of rotation to a slide portion of the cylindrical slide packing is smaller than an inside diameter of the ultrasonic motor.

7. An imaging apparatus, comprising:

a camera unit rotatable in a pan direction;

a base member to which the camera unit is mounted;

a rotation shaft that is a center of rotation of the camera unit;

a fixing member that fixes the rotation shaft;

a presser member that is fixed to the rotation shaft;

an ultrasonic motor that is disposed on a same axis as the rotation shaft, and drives the camera unit in the pan direction, wherein the ultrasonic motor is sandwiched between the presser member and the base member; and a waterproof member that is sandwiched between the base member and the fixing member, wherein a compression force in a rotation axis direction when the ultrasonic motor is sandwiched between the presser member and the base member is different from a compression force in the rotation axis direction when the waterproof member is sandwiched between the fixing member and the base member.

8. The imaging apparatus according to claim 7, further comprising:

a camera side cover member that covers the presser member, the ultrasonic motor, the base member, and the waterproof member; and a cover member for covering the fixing member, wherein the camera side cover member is mutually fitted to the cover member in the rotation axis direction.

9. The imaging apparatus according to claim 7, wherein a compression force in the rotation axis direction when the ultrasonic motor being sandwiched between the presser member and the base member is larger than a compression force in the rotation axis direction when the waterproof member being sandwiched between the fixing member and the base member.

10. The imaging apparatus according to claim 7, wherein the ultrasonic motor includes a rotor and a stator, and the rotor is disposed closer to the camera unit side than the stator.

\* \* \* \* \*